Aug. 28, 1951  E. R. TRAXLER  2,566,262
BELT AND METHOD OF SPLICING THE SAME
Filed Dec. 18, 1947  2 Sheets-Sheet 1
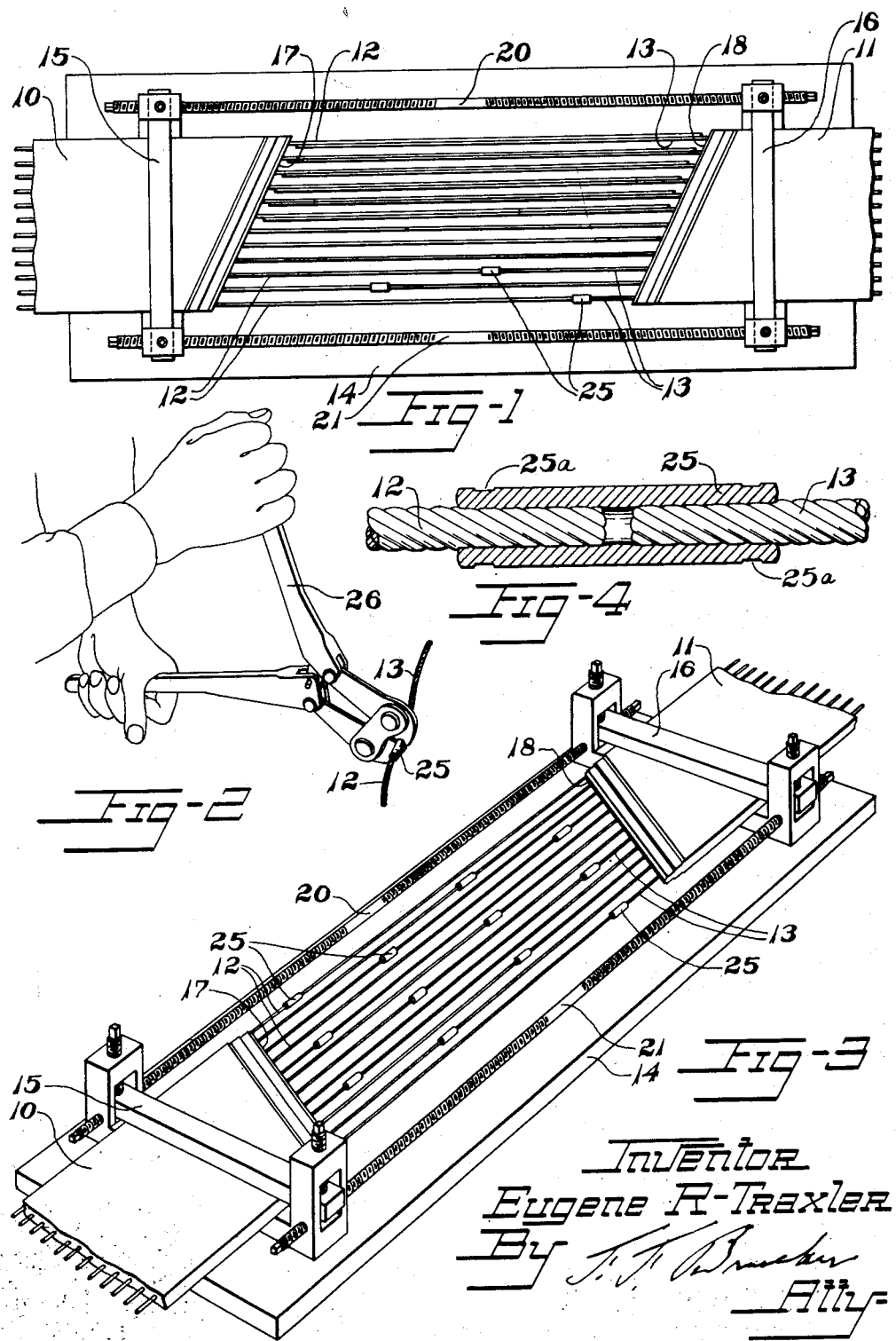
Inventor
Eugene R. Traxler Aug. 28, 1951     E. R. TRAXLER     2,566,262
BELT AND METHOD OF SPLICING THE SAME
Filed Dec. 18, 1947     2 Sheets-Sheet 2
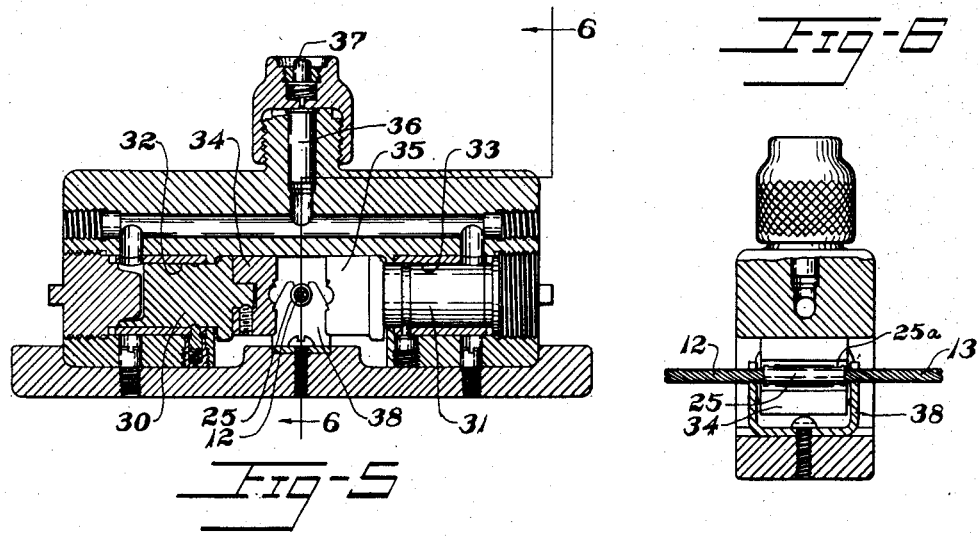
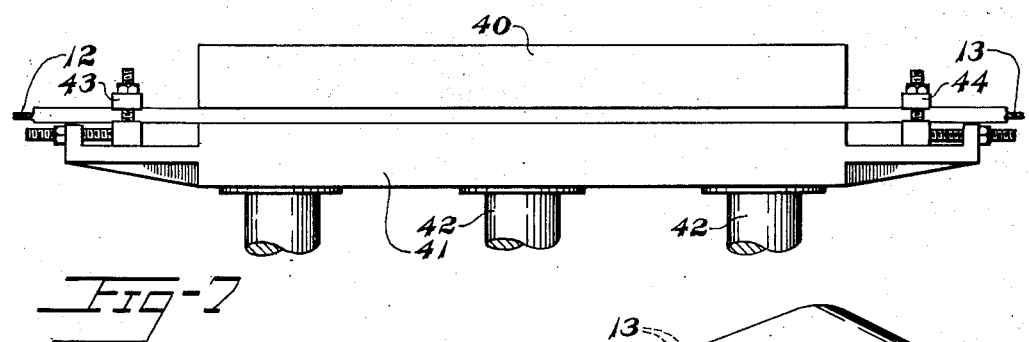
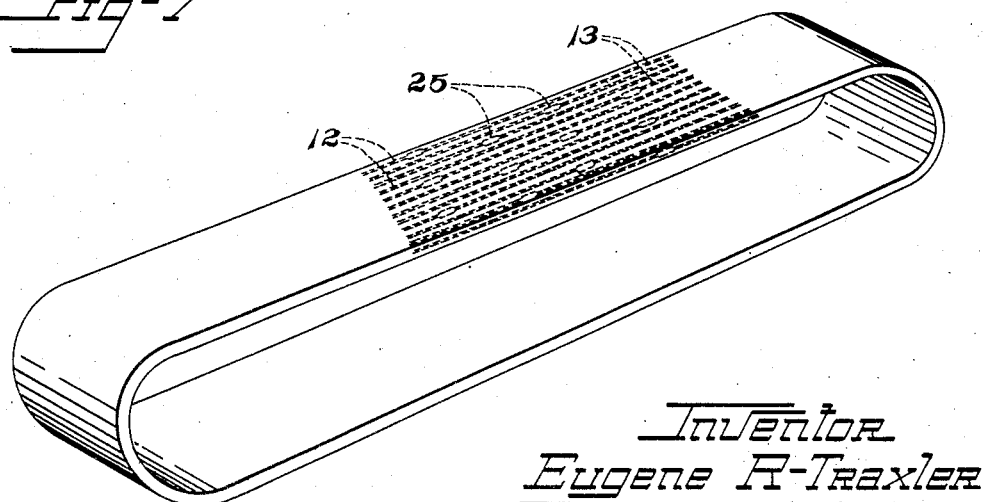
Inventor
Eugene R. Traxler Patented Aug. 28, 1951

2,566,262

UNITED STATES PATENT OFFICE 2,566,262

BELT AND METHOD OF SPLICING THE SAME

Eugene R. Traxler, Akron, Ohio, assignor to The B. F. Goodrich Company, New York, N. Y., a corporation of New York Application December 18, 1947, Serial No. 792,539

12 Claims. (Cl. 74—237)

1

This invention relates to the splicing of belts having longitudinally extending reinforcing members and is especially useful in the splicing of belts having tension-resisting members such as metallic cords, including wire, cable, rope, etc.

In transmission and conveyor belts having longitudinally extending reinforcing members of metallic cords or cables it has been difficult heretofore to splice two belts together or to form an endless belt by splicing the ends of a straight belt as it has been difficult or impossible to join the ends of all the metallic cords under uniform tension, and this has resulted in a spliced belt in which the tension load is sustained by less than the total number of cords.

It is an object of the invention to provide for splicing the tension members with the members under a high degree of uniformity of tension among the members.

Other objects are to provide for splicing the tension members so as to provide members of equal length throughout the spliced belt, to provide for accomplishing the splicing with readily portable equipment, and to provide convenience of procedure.

These and other objects will appear from the following description and the accompanying drawings.

Of the drawings:

Fig. 1 is a plan view of two belt ends held by belt clamps and with the nonmetallic portions of the belts stripped from the cables, some of the cables being indicated as spliced.

Fig. 2 is a perspective view illustrating the initial clamping of splicing ferrules to the cord ends.

Fig. 3 is a perspective view of the belt ends in the belt clamps with all of the cords spliced.

Fig. 4 is a longitudinal section of one of the ferrules with the cord ends securely clamped thereto by final swaging of the ferrules.

Fig. 5 is a sectional elevation of a convenient apparatus for completing the crimping of the ferrules.

Fig. 6 is a cross sectional view taken on line 6—6 of Fig. 5.

Fig. 7 is a side elevation of a splicing press.

Fig. 8 is a perspective view of a spliced belt with the cords shown in dotted lines at the splice.

Referring to the drawings which illustrate the procedure of the invention, the numerals 10, 11 designate a pair of belt members of similar construction, each comprising a body of rubber or other rubber-like material with or without fabric over or under the main reinforcement, or both, and having metallic cords or cables 12, 13 extending intermediate the depth of the belt section and in laterally spaced-apart relation.

In splicing the belt members, they are arranged with their ends in overlapping relation and with the side margins of the belt members in alignment with each other upon a table 14. Belt clamps 15, 16 are clamped to the ends beyond the overlapping portions as shown in Fig. 1 and the rubber or other rubber-like material including fabric or other nonmetallic reinforcements are removed from the belt ends between the clamps 15, 16 to expose the metallic cords, as shown in Fig. 1 where the rubber has been removed to diagonal positions 17, 18. The rubber-like material is preferably removed by cutting and scraping it away. The tension rods 20, 21 extend between the belt clamps and have right and left threaded ends for engaging through threaded apertures in the clamps. These rods hold the belt ends apart and may later be used for applying tension at the splice.

After the rubber-like material has been removed from the cords, the ends of the cords in alignment with each other are cut to abut end to end.

Preferably, to distribute the splices and provide good flexibility throughout the splice, the cords are cut at staggered positions, as shown.

After the ends of the cords have been cut, ends of aligned cords are slipped into tubular connector sleeves or ferrules 25 of deformable metal and with the cord ends extending into the ferrules, the ferrules are crimped lightly as at 25$^a$ upon the ends as by use of a hand-operated crimping tool 26 (see Fig. 2) which squeezes the ferrules about the cords sufficiently to hold them firmly in place but to permit slippage under sufficient tension.

After all the cord ends have been secured within ferrules, the belt clamps 15, 16 are separated by turning the rods 20, 21 so as to tension the cords. Separation is continued until the longest spliced cord is tensioned and the shorter spliced cords are caused to slip in the ferrules by the increased tension.

When all of the spliced cords are straight and under tension, the ferrules are permanently attached, preferably by the application of great pressure thereto. The final attachment of the ferrules by crimping or swaging may be supplemented or replaced by welding, brazing, soldering or other permanent attaching means if desired, although good results have been accomplished without resorting to such expedients.

A convenient apparatus for finally swaging or crimping the ferrules is an explosive operated power press such as that illustrated in Figs. 5 and 6 in which pistons 30, 31 in opposed cylinders 32, 33 and having swaging jaws 34, 35 fixed thereto, are actuated by an explosive cartridge 36 which when exploded by a firing pin 37 fills the cylinders with gas under great pressure and drives the jaws together against the ferrule. The cord ends are supported in proper position for swaging by a locating member 38. Tension on the cords may be released during the final swaging where room is required to clear the swaging tool as the cords have all been adjusted to the same length and held by the first crimping and their ferrules may be swaged one at a time. After swaging, the clamps are again moved to tension the cords.

After splicing of the cords is completed rubber-like material with or without fabric or other reinforcing material is built about the spliced cords to replace that removed for access to the cords. The spliced portion of the belt is then clamped in stretched condition between heated platens 40, 41 of a splicing press, as shown in Fig. 7 and vulcanized by pressure applied by rams 42, tension of the belt being maintained by belt clamps 43, 44 mounted on the press.

The completed belt has substantially the same strength at the splice as at other portions thereof as the cords or cables are all of the same length due to the adjustment of the cords after the first swaging step whereby the shorter cords are slipped with relation to the ferrules while clamped by the ferrules with sufficient pressure to prevent accidental displacement prior to the final swaging of the ferrules. With the cords or cables free from slack and of the same length each cord or cable carries its share of the load.

The spliced belt may be distinguished from a belt not spliced by the method of the invention in that upon X-ray examination the cords or cables are all found to be parallel and free from slack, and upon removal of rubber at the spliced area, for examination purposes, the cables show rubbing marks where they have been slipped with relation to the ferrules after the first swaging step.

Variations may be made without departing from the scope of the invention as it is defined by the following claims.

I claim:

1. The method of splicing a belt having tension-resisting members extending longitudinally thereof which comprises aligning the tension-resisting members of opposed belt ends with each other in pairs of opposed members, inserting the aligned members of each pair in opposite ends of a deformable ferrule, lightly swaging the ferrules, tensioning the spliced members to remove slack and equalize tautness among the members by virtue of ferrule slippage, and then further swaging the ferrules into non-slipping relation with the tension-resisting members.

2. The method of splicing a belt of rubber-like material having tension-resisting members extending longitudinally thereof which comprises exposing the tension-resisting members of opposed belt ends and aligning them with each other, trimming the ends of opposed members to lengths abutting each other with the positions of abutment staggered in different pairs of members to distribute the splices, inserting the aligned members in opposite ends of deformable ferrules, lightly swaging the ferrules, tensioning the spliced members to remove slack and equalize tautness among the members by virtue of slippage, then further swaging the ferrules into non-slipping relation with the tension-resisting members, and building rubber-like material about the spliced tension-resisting members to cover the exposed members.

3. The method of splicing a belt of rubber-like material having reinforcing members extending longitudinally thereof which comprises removing the rubber-like material at the belt ends to expose lengths of said members, aligning said members of opposed belt ends with each other in pairs of opposed members, inserting the aligned members of each pair in opposite ends of a deformable ferrule, lightly swaging the ferrules, tensioning the spliced members to remove slack and equalize tautness among the members by virtue of slippage, then further swaging the ferrules into non-slipping relation with said members, and building material about the spliced members to replace the removed material.

4. The method of splicing a belt of rubber-like material having cables extending longitudinally thereof which comprises removing the rubber-like material at the belt ends to expose lengths of the cables, aligning the cables of opposed belt ends with each other in pairs of opposed cables, trimming the ends of opposed cables to lengths abutting each other with the positions of abutment staggering the abutting positions of the cables in different pairs of cables to distribute the splices, inserting aligned members of each pair in opposite ends of a deformable ferrule, lightly swaging the ferrules, tensioning the spliced cables to remove slack and equalize tautness among the members, then further swaging the ferrules into non-slipping relation with the cables, and building rubber-like material about the exposed cables.

5. The method of making a belt which comprises providing a plurality of tension elements arranged in pairs with the elements of each pair in longitudinal alignment with their ends opposed, lightly clamping ferrules upon the opposed end portions of the elements in frictional engagement therewith, equalizing tautness of the elements by preliminary slippage of the elements under tension in frictional engagement with the ferrules, and permanently attaching the ferrules on said pairs in the equalized condition of the latter by a step including swaging of the ferrules about said elements.

6. A flat transmission belt comprising a body of flexible material a plurality of tension-resisting elements extending in pairs longitudinally therein, the elements of each pair being in longitudinal alignment with their ends opposed, a plurality of single ferrules each disposed upon the end portions of the elements of a pair, said pairs of elements being of substantially equalized tautness in the belt by virtue of a preliminary slippage of elements under tension in frictional engagement with the ferrule and a permanent attachment of the ferrules on said pairs in the equalized condition of the latter.

7. A flat transmission belt comprising a body having a plurality of tension-resisting elements extending in pairs longitudinally therein, the elements of each pair being in longitudinal alignment with their ends opposed, a plurality of single ferrules each disposed upon the end portions of the elements of a pair, said pairs of elements being of substantially equalized tautness in the belt by virtue of a preliminary slippage of elements under tension in frictional engagement with the ferrule and a permanent attachment of the ferrules on said pairs in the equalized condition of the latter.

8. A flat transmission belt comprising a body of rubber-like material having a plurality of tension-resisting elements extending in pairs longitudinally therein, the members of each pair being in longitudinal alignment with their ends opposed, a plurality of single ferrules each disposed upon the end portions of the elements of a pair, said pairs of elements being of substantially equalized tautness in the belt by virtue of a preliminary slippage of elements under tension in frictional engagement with the ferrule and a permanent attachment of the ferrules on the pairs in the equalized condition of the latter.

9. A flat transmission belt comprising a body of rubber-like material having a plurality of tension-resisting metallic cables extending in pairs longitudinally therein, the members of each pair being in longitudinal alignment with their ends opposed, a plurality of single ferrules each disposed upon the end portions of the cables of a pair, said pairs of cables being of substantially equalized tautness in the belt by virtue of a preliminary slippage of cables under tension in frictional engagement with the ferrule and a permanent attachment of the ferrules on the pairs in the equalized condition of the latter.

10. A flexible belt for use under tension about pulleys, said belt comprising a body of flexible material having a plurality of parallel spaced-apart tension members embedded therein and extending in the longitudinal direction of the belt, each tension member comprising a pair of aligned ends in longitudinally spaced-apart relation and a sleeve-like ferrule enclosing said ends in telescopic relation thereto, said ferrule being crimped on each of said ends and holding said tension members in a condition of substantially equalized tautness.

11. A flexible belt for use under tension about pulleys, said belt comprising a body of flexible material having a plurality of parallel spaced-apart metallic cable members embedded therein and extending in the longitudinal direction of the belt, each tension member comprising a pair of aligned cable ends in longitudinally spaced-apart relation, and a metal sleeve-like ferrule enclosing said cable ends in telescopic relation thereto, said sleeve being crimped on each of said ends and holding said cables in a condition of substantially equalized tautness.

12. A flexible belt for use under tension about pulleys, said belt comprising a body of flexible material having a plurality of parallel spaced-apart tension members embedded therein and extending in the longitudinal direction of the belt, each tension member comprising a pair of aligned ends in longitudinally spaced-apart relation and a sleeve-like ferrule enclosing said ends in telescopic relation thereto, said ferrule being crimped on each of said ends, the ferrules on said tension members being distributed longitudinally of the belt in staggered arrangement and holding said tension members in a condition of substantially equalized tautness.

EUGENE R. TRAXLER.

REFERENCES CITED

The following references are of record in the file of this patent:

UNITED STATES PATENTS

| Number | Name | Date |
| --- | --- | --- |
| 738,684 | Ingle | Sept. 8, 1903 |
| 839,028 | Porter | Dec. 18, 1906 |
| 1,261,118 | Geisel | Apr. 2, 1918 |
| 1,411,602 | Barnard | Apr. 4, 1922 |
| 1,420,962 | Breuer | June 27, 1922 |
| 1,599,356 | Auspitzer | Sept. 7, 1926 |
| 2,062,986 | Baxter | Dec. 1, 1936 |
| 2,131,766 | Temple | Oct. 4, 1938 |
| 2,315,894 | Crom | Apr. 6, 1943 |
| 2,441,460 | Walters | May 11, 1948 |

FOREIGN PATENTS

| Number | Country | Date |
| --- | --- | --- |
| 451,955 | France | Feb. 25, 1913 |